United States Patent
Akasawa (10) Patent No.: US 12,237,524 B2
(45) Date of Patent: Feb. 25, 2025

(54) BATTERY PACK AND ELECTRONIC DEVICE

(71) Applicant: Sony Corporation, Tokyo (JP)

(72) Inventor: Hidetoshi Akasawa, Tokyo (JP)

(73) Assignee: Sony Corporation, Tokyo (JP)

( * ) Notice: Subject to any disclaimer, the term of this patent is extended or adjusted under 35 U.S.C. 154(b) by 848 days.

(21) Appl. No.: 17/044,335

(22) PCT Filed: Dec. 27, 2018

(86) PCT No.: PCT/JP2018/048115
§ 371 (c)(1),
(2) Date: Oct. 1, 2020

(87) PCT Pub. No.: WO2019/198279
PCT Pub. Date: Oct. 17, 2019

(65) Prior Publication Data
US 2021/0083348 A1    Mar. 18, 2021

(30) Foreign Application Priority Data

Apr. 10, 2018 (JP) .................................. 2018-075118

(51) Int. Cl.
*H01M 50/242* (2021.01)
*H01M 10/0525* (2010.01)
*H01M 50/204* (2021.01)
*H01M 50/247* (2021.01)

(52) U.S. Cl.
CPC ..... *H01M 50/242* (2021.01); *H01M 10/0525* (2013.01); *H01M 50/204* (2021.01); *H01M 50/247* (2021.01); *H01M 2220/30* (2013.01)

(58) Field of Classification Search
None
See application file for complete search history.

(56) References Cited

U.S. PATENT DOCUMENTS

| | | |
|---|---|---|
| 6,428,934 B1 | 8/2002 | Hatazawa et al. |
| 2007/0037046 A1 | 2/2007 | Takahashi et al. |
| 2009/0186268 A1 | 7/2009 | Song |
| 2012/0052333 A1* | 3/2012 | Baek .................. H01M 50/202 429/7 |
| 2012/0261206 A1 | 10/2012 | Yasui |

(Continued)

FOREIGN PATENT DOCUMENTS

| | | |
|---|---|---|
| CN | 1828979 A | 9/2006 |
| CN | 1913197 A | 2/2007 |

(Continued)

OTHER PUBLICATIONS

English language machine translation of KR-2007-0075945-A. (Year: 2023).*

(Continued)

*Primary Examiner* — Eli S Mekhlin
(74) *Attorney, Agent, or Firm* — XSENSUS LLP (57) ABSTRACT

A battery pack and an electronic device are proposed that suppress an increase in size of a battery pack, and decrease damage to a battery element due to an external impact.
A battery pack includes: a battery cell including a battery element; at least one holder facing an end of the battery element; and an impact absorbing structure formed at the holder.

18 Claims, 3 Drawing Sheets

(56) References Cited

U.S. PATENT DOCUMENTS

| | | | | |
|---|---|---|---|---|
| 2013/0017422 A1* | 1/2013 | Bae | ................... | H01M 50/209 |
| | | | | 429/82 |
| 2013/0224530 A1* | 8/2013 | Baek | .................. | H01M 50/291 |
| | | | | 429/7 |
| 2014/0093751 A1 | 4/2014 | Schaefer | | |
| 2015/0044540 A1* | 2/2015 | Morton | ............... | H01M 10/625 |
| | | | | 29/890.035 |
| 2015/0357670 A1* | 12/2015 | Yamafuku | ........... | H01M 50/477 |
| | | | | 429/94 |
| 2018/0175338 A1 | 6/2018 | Osako et al. | | |

FOREIGN PATENT DOCUMENTS

| | | | |
|---|---|---|---|
| CN | 101529619 A | 9/2009 | |
| CN | 102386349 A | 3/2012 | |
| EP | 2157632 A1 | 2/2010 | |
| EP | 2423997 A | 2/2012 | |
| JP | 2000-173641 A | 6/2000 | |
| JP | 2002-343322 A | 11/2002 | |
| JP | 2006080072 A | 3/2006 | |
| JP | 2007-048725 A | 2/2007 | |
| JP | 2008-235170 A | 10/2008 | |
| JP | 2009-170417 A | 7/2009 | |
| JP | 2011090883 A | 5/2011 | |
| JP | 2013-026090 A | 2/2013 | |
| JP | 2016-091991 A | 5/2016 | |
| KR | 2007-0075945 A * | 7/2007 | ............ H01M 50/15 |
| WO | WO-2013171205 A1 * | 11/2013 | ............. F28F 1/022 |
| WO | 2016/189745 A1 | 12/2016 | |

OTHER PUBLICATIONS

English language machine translation of WO-2013171205-A1. (Year: 2023).*

International Search Report and Written Opinion mailed on Mar. 5, 2019 for PCT/JP2018/048115 filed on Dec. 27, 2018, 10 pages including English Translation of the International Search Report.

* cited by examiner

BATTERY PACK AND ELECTRONIC DEVICE

CROSS-REFERENCE TO RELATED APPLICATIONS

The present application is based on PCT filing PCT/JP2018/048115, filed Dec. 27, 2018, which claims priority to JP 2018-075118, filed Apr. 10, 2018, the entire contents of each are incorporated herein by reference.

TECHNICAL FIELD

The present disclosure relates to a battery pack and an electronic device.

BACKGROUND ART

Various portable electronic devices (hereinafter may also be referred to as the "mobile devices"), such as mobile phones typical ones of which are smartphones, tablet computers have been known. A problem of the mobile devices to be solved is preventing internal components from being damaged by an impact of the drop.

A secondary battery typical one of which is a lithium-ion secondary battery is installed in the mobile devices. There is a possibility that such a secondary battery is also damaged since the secondary battery moves through a space within a mobile device due to an impact of a drop of the mobile device, and the secondary battery collides with an internal wall or the like within the mobile device. Therefore, measures have been taken to decrease damage to the secondary battery due to an impact of a drop of the mobile device.

For example, Patent Document 1 discloses a battery cell applicable to portable electronic devices and including a battery element contained in a packaging material including a laminate film. The battery cell includes a resin layer inserted on at least one side of the battery element, and separating the battery element from the packaging material. In the battery cell disclosed in Patent Document 1, an impact absorbing effect of the resin layer protects the battery element from external impacts.

CITATION LIST

Patent Document

Patent Document 1: Japanese Patent Application Laid-Open No. 2000-173641

SUMMARY OF THE INVENTION

Problems to be Solved by the Invention

However, in the battery cell disclosed in Patent Document 1, the resin layer for absorbing an impact is added between the battery element and the packaging material. The battery cell disclosed in Patent Document 1 increases a size of a battery pack. Mobile devices highly need to be downsized. Therefore, preferably, an increase in size of battery packs is avoided as much as possible.

Therefore, the present disclosure proposes a battery pack and an electronic device that are novel and improved, suppress an increase in size of a battery pack, and decrease damage to a battery element due to an external impact.

Solutions to Problems

The present disclosure provides a battery pack including: a battery cell including a battery element; at least one holder facing an end of the battery element; and an impact absorbing structure formed at the holder.

Furthermore, the present disclosure provides an electronic device including the above battery pack.

Effects of the Invention

As described above, the present disclosure suppresses an increase in size of a battery pack, and can decrease damage to a battery element due to an external impact.

Note that the above effects are not necessarily limiting. In addition to or instead of the above effects, any of effects described in the present specification or other effects that can be grasped from the present specification may be obtained.

MODE FOR CARRYING OUT THE INVENTION

Hereinafter, a preferred exemplary embodiment of the present disclosure will be described in detail with reference to the accompanying drawings. Note that in the present specification and the drawings, components having substantially the same function and configuration are denoted by the same reference numeral, and redundant description is omitted.

Note that the description will be made in the following order.

1. BASIC-CONFIGURATION EXAMPLE OF BATTERY PACK
2. IMPACT ABSORBING STRUCTURE
3. VARIATIONS

In the present specification, a structure that includes a battery element and has not been coated with a laminate sheet is referred to as a battery cell. The battery cell connected to a circuit board and to which a laminate sheet, a top holder, and a bottom holder are attached is referred to as a battery pack. Furthermore, a side of the battery pack and the battery cell from which a positive terminal and a negative terminal protrude is referred to as a top portion. A side of the battery pack and the battery cell facing the top portion is referred to as a bottom portion. The other portions of the battery pack and the battery cell are referred to as side portions. Moreover, a length in a direction of both the side portions may be referred to as a width. A length in a direction of the top portion—the bottom portion may be referred to as a height.

<1. Basic-Configuration Example of Battery Pack>

Figure 1:
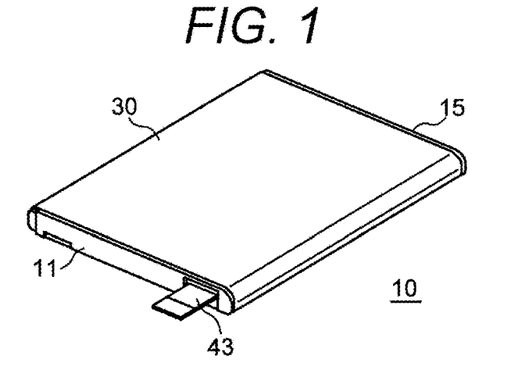
FIG. 1 is a perspective view illustrating an appearance of a battery pack.
Figure 2:
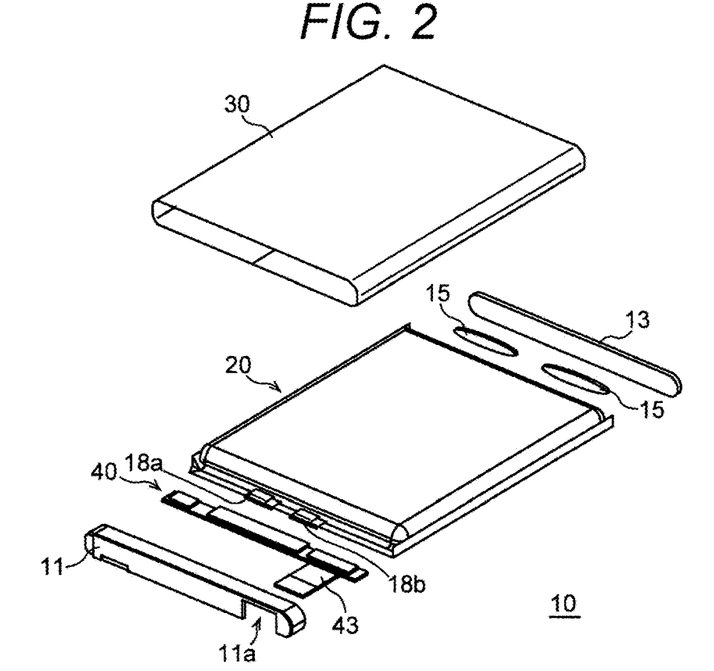
FIG. 2 is an exploded perspective view illustrating a basic-configuration example of the battery pack.

First, a basic-configuration example of a battery pack according to an exemplary embodiment of the present disclosure will be described. In the following description, basic aspects of components of the battery pack according to the present exemplary embodiment will be described. The components of the battery pack according to the present exemplary embodiment are also included by conventional battery packs. FIG. 1 is a perspective view illustrating an appearance of a battery pack 10. FIG. 2 is an exploded perspective view illustrating a configuration example of the battery pack 10.

The battery pack 10 according to the present exemplary embodiment is, for example, a prismatic or flat lithium-ion secondary battery pack. The battery pack 10 is installed in a portable electronic device. The electronic device may be configured so that a user cannot attach and detach the battery pack 10, or may be configured so that a user can attach and detach the battery pack 10.

Examples of the electronic device include a mobile phone, such as a smartphone, a tablet computer, a notebook personal computer, a personal digital assistant (PDA), a display device, a navigation system, an electronic book, an electronic dictionary, a music player, and the like. However, the electronic device is not limited to these examples.

As illustrated in FIG. 2, the battery pack 10 includes a battery cell 20, a top holder 11, a bottom holder 13, a circuit board 40, and a laminate sheet 30. The battery cell 20 includes a battery element coated with a laminate film, such as a soft aluminum sheet or the like, for example, and electrically connected to the circuit board 40. The laminate sheet 30 is wound around and adhered to a periphery of the battery cell 20. Openings are formed at a top portion and a bottom portion of the battery cell 20 around which the laminate sheet 30 is wound. The top holder 11 is attached to the opening at the top portion. The bottom holder 13 is attached to the opening at the bottom portion.

Note that an electrically insulating adhesive sheet or the like for fixing the circuit board 40 and the top holder 11 is not illustrated in FIG. 2.

(Battery Cell)

The battery cell 20 includes the battery element including a positive terminal 18a and a negative terminal 18b. The positive terminal 18a and the negative terminal 18b are coated with an insulating insulating sheet (not illustrated). However, portions of the positive terminal 18a and the negative terminal 18b that are connected to the circuit board 40 are not coated.

Figure 3:
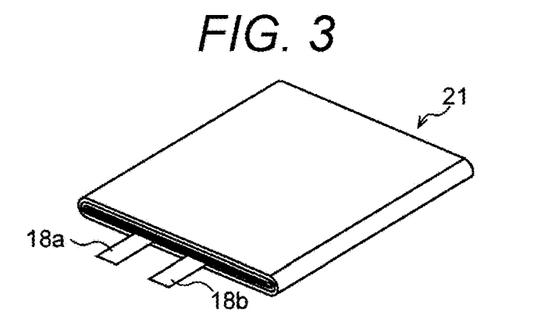
FIG. 3 is a perspective view illustrating an appearance of a battery element.

FIG. 3 is a perspective view illustrating a configuration example of a battery element 21 constituting the battery cell 20. The battery element 21 is a laminate that includes a positive electrode, a separator, a negative electrode, and a separator that are laminated in this order. The battery element 21 of the battery pack 10 according to the present exemplary embodiment is a wound battery element that includes a wound laminate that has a shape like a band. The positive terminal 18a is connected to the positive electrode of the battery element 21. The negative terminal 18b is connected to the negative electrode of the battery element 21.

The battery element 21 is contained in a laminate film (not illustrated), such as a soft aluminum sheet. The battery cell 20 is formed in a shape like a flat thin plate to cope with downsizing or thinning of electronic devices. Such a battery element 21 may be a known battery element.

(Circuit Board)

The circuit board 40 is disposed on the top portion of the battery cell 20 that has a shape like a plate. The circuit board 40 is connected to the positive terminal 18a and the negative terminal 18b of the battery element 21. On the circuit board 40, a temperature detection element, a fuse, and a thermal sensitive resistor that are not illustrated are mounted, for example. Furthermore, the circuit board 40 is connected to a flexible circuit board 43 connected to a device main body of an electronic device.

(Top Holder and Bottom Holder)

The top holder 11 is attached to an end of the top portion of the battery cell 20. The battery cell 20 and the top holder 11 that is disposed at, for example, the end of the top portion of the battery cell 20 are wrapped and fixed with the laminate sheet 30.

The circuit board 40 is held in the top holder 11. The top holder 11 has an opening 11a at a position corresponding to a position of the flexible circuit board 43 connected to the circuit board 40. The flexible circuit board 43 protrudes outside through the opening 11a.

The bottom holder 13 is attached to an end of the bottom portion of the battery cell 20. The battery cell 20 and the bottom holder 13 that is disposed at, for example, the end of the bottom portion of the battery cell 20 are wrapped and fixed with the laminate sheet 30. Moreover, the bottom holder 13 illustrated in FIG. 2 is fixed to the battery cell 20 with an adhesive 15.

Note that FIG. 2 schematically illustrates configurations of the top holder 11 and the bottom holder 13.

(Laminate Sheet)

The laminate sheet 30 has a substantially rectangular shape and is adhered to the battery cell 20 such that the laminate sheet 30 wraps the battery cell 20. The laminate sheet 30 is adhered around the battery cell 20 with an adhesive layer. The laminate sheet 30 is a protective sheet for protecting the battery cell 20. The laminate sheet 30 may have strength higher than a laminate sheet including resin. Therefore, the battery cell 20 is protected from external impacts. The laminate sheet 30 may be, for example, a laminate that includes a hard aluminum layer on both surfaces of which an electrically insulating resin layer is laminated. The resin layers are layers including, for example, a polyethylene terephthalate (PET) resin.

<2. Impact Absorbing Structure>

Impact absorbing structures of the battery pack 10 according to the present exemplary embodiment that are formed at the top holder 11 and the bottom holder 13 will be described.

As described above, in the battery pack 10, the battery element 21 includes a wound laminate that has a shape like a band. Ends of the laminate that has a shape like a band in a width direction of the laminate are at a top portion and a bottom portion. Therefore, if an impact is applied to the battery pack 10 in a direction of the top portion or the bottom portion, an end of the battery element 21 is likely to be damaged. For example, there is a possibility that deformation of an end of the battery element 21 damages the separator, and a short circuit occurs between the positive electrode and the negative electrode.

To prevent such damage, the top holder 11 attached to an end of the top portion of the battery cell 20 is formed integrally with an impact absorbing structure. The bottom holder 13 attached to an end of the bottom portion of the battery cell 20 is formed integrally with an impact absorbing structure. The impact absorbing structures decrease an impact of a drop or the like.

Figure 4:
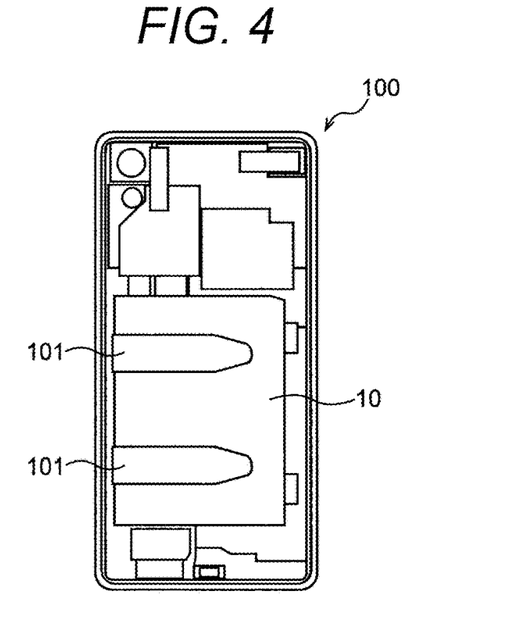
FIG. 4 is a schematic view illustrating a structure within an electronic device.

FIG. 4 is a schematic view illustrating a structure within an electronic device 100 in which the battery pack 10 is installed. In FIG. 4, a back cover is removed from the electronic device 100. The electronic device 100 illustrated in FIG. 4 is a thin smartphone as an example. The battery pack 10 is disposed such that a direction of the top portion—the bottom portion of the battery pack 10 is along a longitudinal direction of the electronic device 100. The battery pack 10 is installed in the electronic device 100. The battery pack 10 is electrically connected to a device main body through connection terminals of the flexible circuit board 43.

The battery pack 10 is positioned at a predetermined position. Between the battery pack 10 and components around the battery pack 10, a space is formed within a predetermined range of a tolerance. Furthermore, the battery pack 10 is fixed to the inside of the device main body of the electronic device 100 with a double-sided tape 101. In the example illustrated in FIG. 4, the battery pack 10 is fixed to the back cover (not illustrated) with the double-sided tape 101. Therefore, in a case where a relatively light impact is applied to the electronic device 100, the battery pack 10 is less likely to become out of position within the electronic device 100.

However, in a case where a strong impact is applied to the electronic device 100, the battery pack 10 may move in the electronic device 100, and may collide with an inner wall of the electronic device 100, other electronic components, or the like, and thus the battery element 21 may be damaged. To decrease such damage to the battery element 21, the impact absorbing structures are formed at the top holder 11 and the bottom holder 13.

Figure 5:
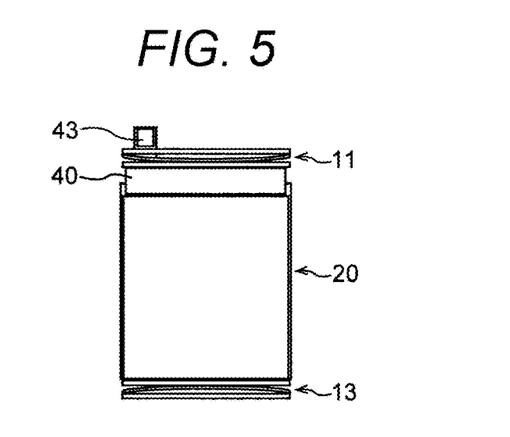
FIG. 5 is a schematic view illustrating a configuration example of a battery pack according to a present exemplary embodiment.
Figure 6:
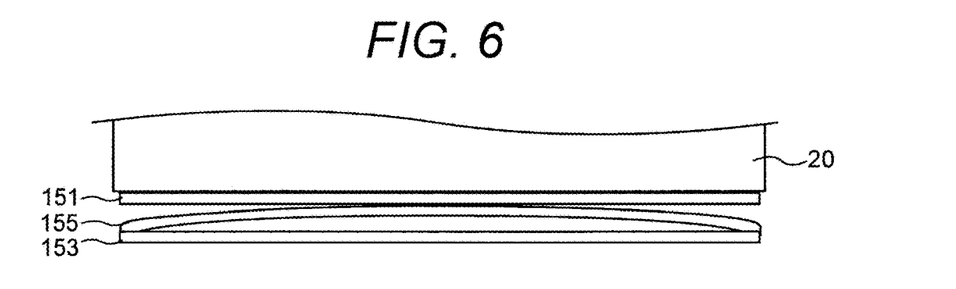
FIG. 6 is a schematic view illustrating a configuration example of a bottom holder of the battery pack according to the exemplary embodiment.

FIG. 5 is a schematic view illustrating a state where the laminate sheet 30 is removed from the battery pack 10 according to the present exemplary embodiment. FIG. 6 is a schematic view illustrating one configuration example of the bottom holder 13. Note that since the impact absorbing structure of the top holder 11 can have a configuration similar to the impact absorbing structure of the bottom holder 13, only the configuration of the bottom holder 13 will be described here.

The bottom holder 13 includes a first member 151 and a second member 153 that are arranged along a direction being away from an end of the bottom portion of the battery cell 20. The bottom holder 13 includes an elastic-deformation portion 155 disposed between the first member 151 and the second member 153. That is, the impact absorbing structure of the bottom holder 13 illustrated in FIG. 6 has an elastic structure. Both ends of the elastic-deformation portion 155 are connected to both ends of the second member 153. The elastic-deformation portion 155 is curved and protrudes toward the first member 151. The center of the elastic-deformation portion 155 is connected to the first member 151.

The bottom holder 13 may be an integrally molded product including, for example, a resin material. Alternatively, the bottom holder 13 may be a molded product that includes the first member 151, the second member 153, and the elastic-deformation portion 155 that are joined together.

The first member 151 is joined to an end of the bottom portion of the battery cell 20 with an adhesive or the like (not illustrated). The second member 153 is at an end of the bottom portion of the battery pack 10. For example, the first member 151 and the elastic-deformation portion 155 may be completely coated with the laminate sheet 30, and part of the second member 153 need not to be coated with the laminate sheet 30 and may be exposed.

Figure 7:
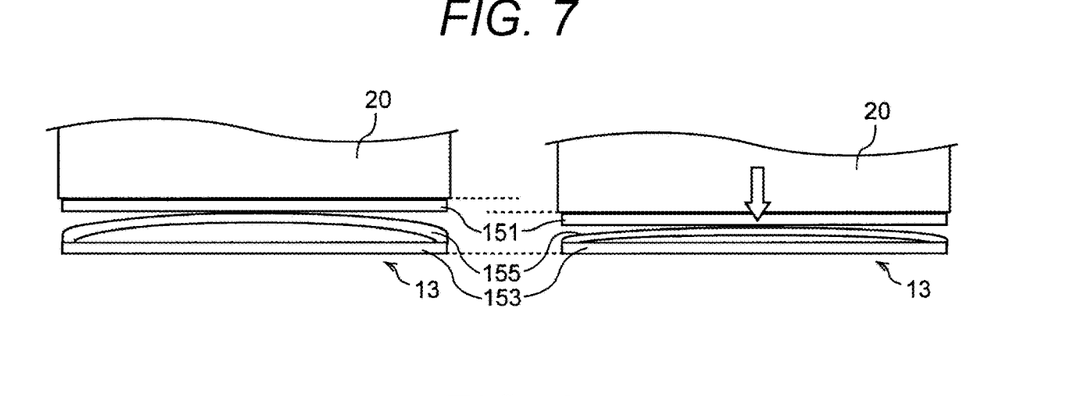
FIG. 7 is an illustration illustrating states of the bottom holder that is elastically deforming.

FIG. 7 is an illustration illustrating states of the bottom holder 13 that is deforming when the electronic device 100 drops while the bottom portion of the battery pack 10 is facing downward.

If the battery pack 10 moves downward due to an impact of a drop of the electronic device 100, the elastic-deformation portion 155 deforms such that a distance between the first member 151 and the second member 153 of the bottom holder 13 becomes shorter. Therefore, at least part of the impact is absorbed, and the impact applied to the battery cell 20 is decreased.

A degree to which the elastic-deformation portion 155 of the impact absorbing structure of such a bottom holder 13 bends can be adjusted by changing a height of the elastic-deformation portion 155, or changing a thickness of a portion that constitutes the elastic-deformation portion 155. The height of the elastic-deformation portion 155 corresponds to a distance between the first member 151 and the second member 153. With this arrangement, a degree to which an impact is absorbed by the bottom holder 13 can be adjusted.

In FIG. 6, a ratio of a vertical length to a lateral length is increased to allow the configuration of the bottom holder 13 to be easily understood. In a case of the battery pack 10 for smartphones, for example, preferably, a width (lateral length) of the bottom holder 13 is approximately 5 cm, and a height (vertical length) of the bottom holder 13 is approximately 0.2 cm. In a case where a height of the bottom holder 13 is approximately 0.2 cm, the height is equal to a height of conventional bottom holders. Therefore, an increase in size of the battery pack 10 can be suppressed.

<3. Variations>

The configuration example of the battery pack 10 according to the present exemplary embodiment has been described above. However, impact absorbing structures of the top holder 11 and the bottom holder 13 of the battery pack 10 according to the present exemplary embodiment are not limited to the above example. Hereinafter, variations of the impact absorbing structures of the top holder 11 and the bottom holder 13 will be described.

(3-1. First Variation)

Figure 8:
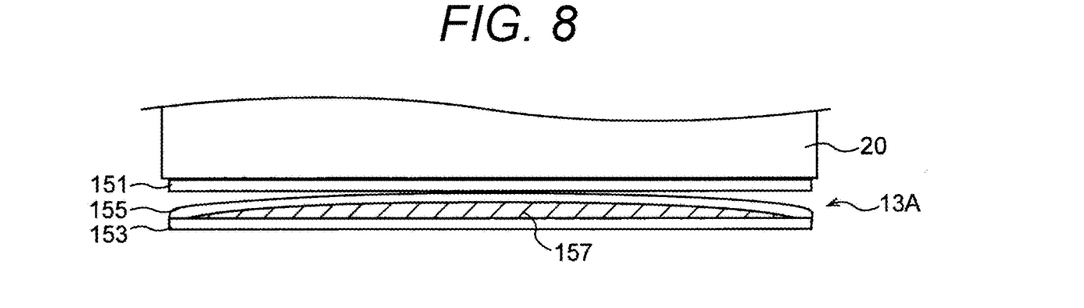
FIG. 8 is a schematic view illustrating a bottom holder according to a first variation.

FIG. 8 is a schematic view illustrating a bottom holder 13A according to a first variation. In the bottom holder 13A according to the first variation, a resin material 157 is filled in a space between the elastic-deformation portion 155 and the second member 153 of the bottom holder 13 described in the above exemplary embodiment. Such a resin material 157 functions as an adjusting portion that adjusts a degree to which an impact is absorbed.

In an example illustrated in FIG. 8, the resin material 157 is filled in the whole space between the elastic-deformation portion 155 and the second member 153. However, a resin material may be filled in part of the space. The degree to which an impact is absorbed by the bottom holder 13A can be adjusted by filling the resin material that has elasticity in the space between the elastic-deformation portion 155 and the second member 153.

Note that an impact absorbing structure of the top holder 11 can have a configuration similar to the impact absorbing structure of the bottom holder 13 according to the first variation.

(3-2. Second Variation)

Figure 9:
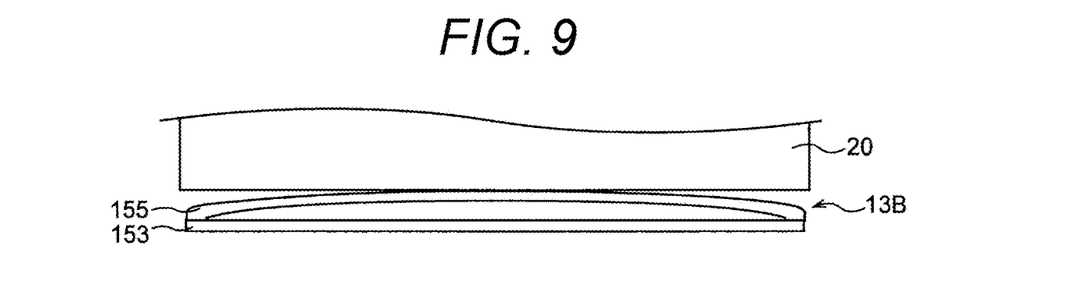
FIG. 9 is a schematic view illustrating a bottom holder according to a second variation.

FIG. 9 is a schematic view illustrating a bottom holder 13B according to a second variation. The bottom holder 13B according to the second variation does not include the first member 151 of the bottom holder 13 described in the above exemplary embodiment, and includes the elastic-deformation portion 155 on the second member (base member) 153. Since the bottom holder 13B according to the second variation does not include the first member 151, a height (length in a vertical direction in the drawing) of the bottom holder 13B becomes smaller. An increase in size of the battery pack 10 can be further suppressed.

Note that similarly as the first variation, a degree to which an impact is absorbed by the bottom holder 13B in the second variation may be adjusted by filling a resin material that has elasticity in a space between the elastic-deformation portion 155 and the second member 153. Furthermore, an impact absorbing structure of the top holder 11 can have a configuration similar to the impact absorbing structure of the bottom holder 13B according to the second variation.

(3-3. Third Variation)

Figure 10:
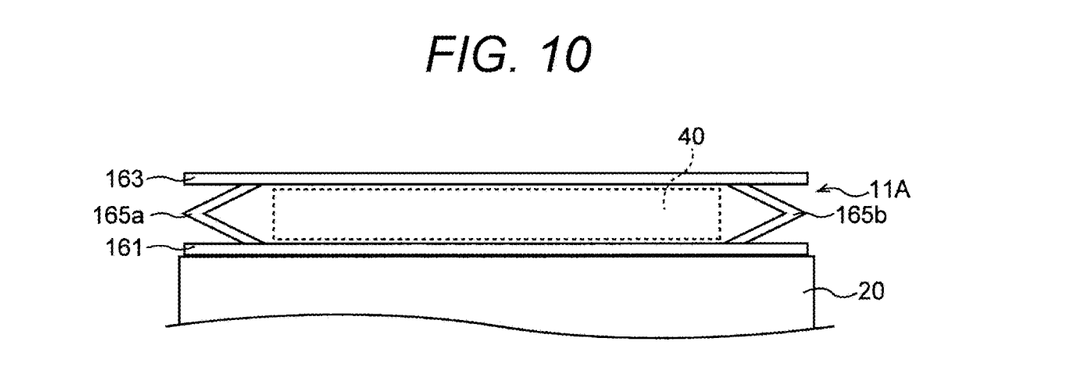
FIG. 10 is a schematic view illustrating a top holder according to a third variation.

FIG. 10 is a schematic view illustrating a top holder 11A according to a third variation. An elastic-deformation portion 165 of the top holder 11A according to the third variation is disposed between a first member 161 and a second member 163. The elastic-deformation portion 165 is different from the elastic-deformation portion 155 of the bottom holder 13 described in the above exemplary embodiment. In the top holder 11A according to the third variation, the first member 161 and the second member 163 are connected to each other by elastic-deformation portions 165a, 165b that are at left and right end sides, respectively.

Shapes of cross sections of the two elastic-deformation portions 165a, 165b are each V-shaped. The two elastic-deformation portions 165a, 165b are disposed such that bent portions that have V-shaped cross sections each face outward. Of the top holder 11A according to the third variation, at least the elastic-deformation portions 165a, 165b include a resin material that has been molded into the elastic-deformation portions 165a, 165b. Therefore, if the battery pack 10 moves upward in the drawing due to an impact of a drop of the electronic device 100, the elastic-deformation portion 165 deforms such that a distance between the first member 161 and the second member 163 of the top holder 11A becomes shorter. Therefore, at least part of the impact is absorbed, and the impact applied to the battery cell 20 is decreased.

A stroke length of the elastic-deformation portion 165 at a time of deformation is longer than a stroke length of the impact absorbing structure of the bottom holder 13 described in the above exemplary embodiment. The top holder 11A according to the third variation absorbs a more impact. Furthermore, in the top holder 11A according to the third variation, a space surrounded by the first member 161, the second member 163, and the elastic-deformation portions 165a.165b is large. Therefore, components including the circuit board 40 and the like are arranged in the space. The stroke length at a time of elastic deformation increases, and an increase in size of the battery pack 10 can be suppressed.

Note that similarly as the first variation, a degree to which an impact is absorbed by the top holder 11A in the third variation may be adjusted by filling a resin material that has elasticity in a space between the first member 161, the second member 163, and the elastic-deformation portions 165a, 165b. Furthermore, an impact absorbing structure of the bottom holder 13 can have a configuration similar to the impact absorbing structure of the top holder 11A according to the third variation.

As described above, the battery pack 10 according to the present exemplary embodiment does not include additional components. The top holder 11 and the bottom holder 13 that are components constituting the battery pack 10 include the impact absorbing structures. Therefore, a possibility that downsizing of portable electronic devices is hindered is decreased, and an impact due to a drop or the like can be decreased.

Furthermore, an elastic force or an impact absorbing ability of the battery pack 10 according to the present exemplary embodiment can be adjusted by changing type of the resin material that the top holder 11 and the bottom holder 13 include, or by changing form of the elastic-deformation portion 155. Therefore, the battery pack 10 can be applied not only to smartphones, but also to various portable electronic devices.

As described above, the preferred exemplary embodiment of the present disclosure has been described in detail with reference to the accompanying drawings, but the technical scope of the present disclosure is not limited to such examples. It is apparent that those having ordinary knowledge in the technical field of the present disclosure can conceive various changes or modifications within the scope of the technical idea described in the claims. It is understood that the various changes or modifications also naturally belong to the technical scope of the present disclosure.

For example, in the battery pack 10 according to the above exemplary embodiment, the impact absorbing structures are formed at both the top holder 11 and the bottom holder 13. The top holder 11 and the bottom holder 13 are arranged near ends of the laminate in a width direction of the laminate. The laminate constitutes the battery element 21 and has a shape like a band. However, the technology of the present disclosure is not limited to such an example. The impact absorbing structure may be formed at only one of the top holder 11 and the bottom holder 13.

Furthermore, in the battery pack 10 according to the above exemplary embodiment, a battery element including a laminate that has a shape like a band is used as the battery element 21. However, the technology of the present disclosure is not limited to such an example. The battery element 21 may be a layered battery element that includes a positive electrode, a separator, a negative electrode, and a separator that are repeatedly laminated. In this case, ends of the positive electrode and the negative electrode exist at a whole periphery of the battery element 21. Therefore, holders that include impact absorbing structures may be disposed not only at the top portion and the bottom portion, but also at an appropriate end(s) of the periphery of the battery cell 20. Therefore, even in a case where an electronic device drops in any direction, an impact of the drop is decreased. Damage to the battery element 21 can be suppressed.

Furthermore, effects described in the present specification are merely illustrative or exemplary, and are not limiting. That is, in addition to or instead of the above effects, the technology according to the present disclosure may have other effects that are obvious to those skilled in the art from the description in the present specification.

Note that the following configurations also belong to the technical scope of the present disclosure.

(1) A battery pack including: a battery cell including a battery element; at least one holder facing an end of the battery element; and an impact absorbing structure formed at the holder.

(2) The battery pack according to the item (1), in which the impact absorbing structure includes an elastic-deformation portion disposed at the holder.

(3) The battery pack according to the item (2), in which the holder includes: a first member and a second member that are arranged along a direction being away from the end of the battery element; and the elastic-deformation portion disposed between the first member and the second member.

(4) The battery pack according to the item (2), in which the holder includes: a base member; and the elastic-deformation portion disposed closer to the end of the battery cell than the base member is disposed.

(5) The battery pack according to any one of the items (2) to (4), in which the impact absorbing structure includes an adjusting portion that adjusts a degree to which an impact is absorbed.

(6) The battery pack according to any one of the items (1) to (5), in which the battery element is a wound battery element that includes wound electrode layers; and the holder faces at least one of ends of the wound electrode layers in a width direction.

(7) The battery pack according to any one of the items (1) to (5), in which the battery element is a layered battery element that includes electrode layers that are laminated; and the holder faces at least one of four edges of the electrode layers.

(8) The battery pack according to any one of the items (1) to (7), in which the battery pack includes a protective sheet wound around the battery cell, and the holder is disposed at an end side of the wound protective sheet in a width direction.

(9) An electronic device including a battery pack, in which the battery pack includes: a battery cell including a battery element; at least one holder facing an end of the battery element; and an impact absorbing structure formed at the holder.

REFERENCE SIGNS LIST

10 Battery pack
11 Top holder
13 Bottom holder
20 Battery cell
21 Battery element
30 Laminate sheet (Protective sheet)
100 Electronic device
151 First member
153 Second member
155 Elastic-deformation portion
157 Adjusting portion (Resin material)

The invention claimed is:
1. A battery pack comprising:
a battery cell including a battery element having a first surface from which at least one terminal extends and a second surface, opposite the first surface along a longitudinal direction having no terminals;
a first member facing the second surface of the battery element along the longitudinal direction;
a second member spaced from the first member along the longitudinal direction, the second member being closer to the battery cell than the first member and secured to the second surface of the battery cell; and
an adjustable support between the first member and the second member, wherein the adjustable support is configured to provide a first distance between the first member and the second member along the longitudinal direction in a first state and a second distance between the first member and the second member along the longitudinal direction, the second distance being shorter than the first distance, in a second state, wherein the adjustable support is in contact with both the first member and the second member at both the first and second states,
wherein the second member is directly attached to the battery cell,
the second member has a flat surface facing the adjustable support, and
the adjustable support is in direct contact with both the first member and the second member at both the first and second states.

2. The battery pack according to claim 1, wherein a center portion of the adjustable support extends further in the longitudinal direction than a peripheral portion of the adjustable support.

3. The battery pack according to claim 2, wherein
the adjustable support is secured to opposite of the first member along a width direction, providing a space between the first member and the adjustable support that is larger in the center portion than in the peripheral portion.

4. The battery pack according to claim 3, wherein the space between the adjustable support and the first member is at least partially filled with a deformable material.

5. The battery pack according to claim 1, wherein
the battery element is a wound battery element that includes wound electrode layers; and
the first member faces at least one of ends of the wound electrode layers in a width direction.

6. The battery pack according to claim 1, wherein
the battery element is a layered battery element that includes electrode layers that are laminated; and
the first member faces at least one of four edges of the electrode layers.

7. The battery pack according to claim 1, wherein
the battery pack includes a protective sheet wound around the battery cell, and
the first member is disposed at an end side of the wound protective sheet in a width direction.

8. The battery pack according to claim 1, wherein the adjustable support is curved.

9. The battery pack according to claim 1, wherein a center portion of the adjustable support extends further in the longitudinal direction than a peripheral portion of the adjustable support and the center portion of the adjustable support is secured to a center of the second member along the longitudinal direction.

10. The battery pack according to claim 1, wherein the adjustable support includes a first adjustable support at a first end of the first member and a first end of the second member and a second adjustable support at a second end of the first member and a second end of the second member, the first and second ends being spaced along the width direction.

11. The battery pack according to claim 10, wherein the first adjustable support and the second adjustable support each have a V-shaped cross-section facing outwards.

12. An electronic device comprising a battery pack, wherein the battery pack includes:
a battery cell including a battery element having a first surface from which at least one terminal extends and a second surface, opposite the first surface along a longitudinal direction having no terminals;
a first member facing the second surface of the battery element along the longitudinal direction;
a second member spaced from the first member along the longitudinal direction, the second member being closer to the battery cell than the first member and secured to the second surface of the battery cell; and an adjustable support between the first member and the second member, wherein the adjustable support is configured to provide a first distance between the first member and the second member along the longitudinal direction in a first state and a second distance between the first member and the second member along the longitudinal direction, the second distance being shorter than the first distance, in a second state, wherein the second member is directly attached to the battery cell, the second member has a flat surface facing the adjustable support, and the adjustable support is in direct contact with both the first member and the second member at both the first and second states.

13. The electronic device according to claim 12, wherein a center portion of the adjustable support extends further in the longitudinal direction than a peripheral portion of the adjustable support.

14. The electronic device according to claim 13, wherein the adjustable support is secured to opposite ends of the first member along a width direction, providing a space between the first member and the adjustable support that is larger in the center portion than in the peripheral portion.

15. The electronic device according to claim 14, wherein the space between the adjustable support and the first member is at least partially filled with a deformable material.

16. The electronic device according to claim 13, wherein the adjustable support is curved.

17. The electronic device according to claim 12, wherein a center portion of the adjustable support is secured to a center of the second member along the longitudinal direction.

18. The electronic device according to claim 12, wherein the adjustable support includes a first adjustable support at a first end of the first member and a first end of the second member, and a second adjustable support at a second end of the first member and a second end of the second member, the first and second ends being spaced along the width direction.

* * * * *